United States Patent [19]

Nakaya et al.

[11] Patent Number: 5,797,105
[45] Date of Patent: Aug. 18, 1998

[54] AIR ACTIVE CONTROL AIRCRAFT USING THREE DIMENSIONAL TRUE AIRSPEED DETECTION SYSTEM

[75] Inventors: Teruomi Nakaya, Machida; Osamu Okamoto, Higashi-Yamato; Naoaki Kuwano, Chofu; Seizo Suzuki, Mitaka; Shuichi Sasa, Hachioji; Hidehiko Nakayasu, Kashiwa; Masakazu Sagisaka, Hino, all of Japan

[73] Assignee: National Aerospace Laboratory of Science & Technology, Tokyo, Japan

[21] Appl. No.: 975,110

[22] Filed: Nov. 20, 1997

Related U.S. Application Data

[63] Continuation of Ser. No. 517,970, Aug. 22, 1995, abandoned.

[30] Foreign Application Priority Data

Aug. 23, 1994 [JP] Japan .................................. 6-219582

[51] Int. Cl.[6] .................................................. G06F 165/00
[52] U.S. Cl. ............................ 701/7; 73/861.66; 244/177
[58] Field of Search ............................... 701/3, 4, 7, 10, 701/6, 121, 15, 16; 244/177, 180, 181, 182; 73/178 R, 178 T, 180, 182, 861.66

[56] References Cited

U.S. PATENT DOCUMENTS

| 3,927,306 | 12/1975 | Miller | 364/424.03 |
|---|---|---|---|
| 4,343,035 | 8/1982 | Tanner | 364/424.016 |
| 4,608,641 | 8/1986 | Snell | 364/424.013 |
| 4,725,811 | 2/1988 | Muller et al. | 364/424.016 |
| 4,763,266 | 8/1988 | Schultz et al. | 364/424.019 |
| 4,836,019 | 6/1989 | Hagen et al. | 73/182 |
| 4,863,120 | 9/1989 | Zweifel et al. | 364/424.016 |
| 5,025,661 | 6/1991 | McCormack | 73/180 |
| 5,423,209 | 6/1995 | Nakaya et al. | 73/182 |

*Primary Examiner*—Gary Chin
*Attorney, Agent, or Firm*—Armstrong, Westerman, Hattori, McLeland & Naughton

[57] ABSTRACT

An air active control aircraft having an air three-dimensional true airspeed detection system composed of an air data sensor probe in the form of a truncated pyramid-shape Pitot probe and an air flight velocity operation processor for calculating an air flight velocity vector from three-dimensional air pressure information detected by the air data sensor probe, airframe motion detection sensors for detecting an airframe motion, and an on-board control computer for generating a flight control law. The on-board control computer inputs an air flight velocity vector signal obtained from the air flight velocity vector device into a control-surface control system in parallel with airframe motion detection sensor signals, and presumes a flight motion induced by a change in air to generate the flight control law for quickly carrying out air flight stability control.

7 Claims, 7 Drawing Sheets

AIR ACTIVE CONTROL AIRCRAFT USING THREE DIMENSIONAL TRUE AIRSPEED DETECTION SYSTEM

This application is a continuation of application Ser. No. 08/517.970 filed Aug. 22, 1995, now abandoned.

BACKGROUND OF THE INVENTION

(1) Field of the Invention

The present invention relates to a manned or unmanned air active control aircraft for detecting an air flight velocity vector during flight to predict airframe motion caused by a change in air so as to perform an air flight stabilization control which corresponds to the disturbance detection (hereinafter merely referred to as an air active control aircraft) of an aircraft.

(2) Description of Related Art

With the recent advancement of computer and control technology, there has been progress in the study of an air active control aircraft for actively controlling the flight properties of an aircraft. The air active control aircraft heretofore proposed and known has a control system composed of an on-board control computer, airframe motion detection sensors such as a three-axis gyro and an inertial reference unit, an inherent airframe and aerodynamic data base obtained by a test of a wind tunnel and an engine data base obtained by a test of the engine performance, and various control actuators. The air active control aircraft generates a flight control law by the on-board control computer on the basis of output signals of airframe motion detection sensors for detecting motion of the airframe induced by a change in air and the data base information to feedback control or feedforward control various control of actuators for driving the control surfaces and an engine control actuator for regulating the engine thrust thereby performing the flight stabilization control which corresponds to the disturbance detection (hereinafter merely referred to as flight stabilization control).

However, since the above-described system detects motion of an airframe caused by a change in air to control the flight, there occurs a time lag between a change in actual aerodynamic force such as a lift distribution applied to the airframe due to the change in air and a control of motion of the airframe. Accordingly, when a sudden turbulence such as cross-wind, a gust of wind or wind shear occurs, it is not possible to detect the turbulence to perform the flight stabilization control before the airframe is affected thereby. The results of motion by airframe which was affected by the turbulence are detected as an altitude by means of an altimeter and an attack angle, a sideslip or a turning rate by means of a gyro meter. The control for maintaining a proper attitude can be done merely by a detection signal thereof. As a result, it is not possible to cope with the sudden change in air, thereby producing safety and ride comfort of the aircraft.

Conventionally, in a general aircraft, a meter for directly measuring air information such as direction of wind has not been put to practical use except detection of air speed by way of a static Pitot. A composite flight velocity vector detector comprised of a combination of a Pitot and an arrow type α/β vane is used in an experimental airframe. The composite flight velocity vector detector is of a composite type and has a two-axis movable part, and therefore gives rise to a problem of strength and freezing in a wide speed region, and a problem of a low response resulting from inertia, and reliability at the time of resonance caused by motion of airframe and turbulence of a gust of wind, because of which the aforesaid detector is not yet applied to a practical airframe. Accordingly, even if the conventional airframe receives cross-wind or a gust of wind, or approaches in wind shear, the airframe cannot detect them. A pilot merely calculates or computes an angle of an accelerometer and a rudder, and a sudden change in flight speed and a sudden change in altitude from an altimeter to recognize that a change in air such as wind shear or cross wind occurred.

Therefore, in the control of takeoff and landing, an aircraft is controlled by receiving air information from an air-traffic controller. However, the control with a slight delay in time with respect to the sudden cross-wind, a gust of wind or wind shear sometimes results in an accident. At the time of takeoff and landing, an excessive burden is forced to be imposed on a pilot.

The active control of the aircraft in response to the change in air at real time is a prerequisite for the improvement in safety and comfortableness of the aircraft. It is urgently demanded to control the aircraft in advance, predicting the motion of the airframe with respect to the cross-wind, a gust of wind or wind shear, all of which exert a dangerous influence upon the aircraft particularly at the time of takeoff or landing for preventing an aircraft accident.

In the past, one reason why the flight cannot be controlled in real time in response to the change in air during the flight is that no aerometer which is loaded on the real airframe to measure the change in air during the flight has been developed. The present inventors have previously proposed a three-dimensional true speed detection system using a truncated pyramid-shape Pitot probe capable of detecting a flight velocity vector during the flight by a single probe (see U.S. Pat. No. 5,423,209).

SUMMARY OF THE INVENTION

It is an object of the present invention to provide an air active control aircraft in which an air flight vector with respect to a change in air is taken into a control system in real time to predict airframe motion induced by the change in air so that air flight stability control can be carried out.

The air active control aircraft according to the present invention comprises an air three-dimensional true airspeed detection system composed of an air data sensor probe in the form of a truncated pyramid-shape Pitot probe and an air flight velocity operation processor for calculating an air flight velocity vector from air pressure information detected in three deminsions by said air data sensor probe, airframe motion detection sensors for detecting a airframe motion, and an on-board control computer for generating a flight control law, characterized in that said onboard control computer takes an air flight velocity vector signal obtained from said air flight velocity vector device into a control-surface control system in parallel with airframe motion detection sensor signals to generate the flight control law for carrying out the air flight stability control.

The present invention can be applied to an air active control aircraft with an engine or an active control aircraft without an air engine and to both manned and unmanned airframes therefor. In case of air active control aircraft with an engine, the air flight velocity vector signal is taken into an engine control system for adjusting engine thrust in parallel with airframe motion detection sensor signals. On the other hand, in case of the air active control aircraft without an engine, the air flight stabilization control is carried out merely by the control-surface control.

The truncated pyramid-shape Pitot probe is preferably provided to be projected from the extreme end of the airframe in order to detect change in air flow quickly with minimal positional errors. In case of a supersonic airframe, the truncated pyramid-shape Pitot probe itself constitutes a nose portion to thereby enable the detection of an air velocity vector while maintaining structural strength.

The on-board control computer stores therein various data bases comprising airframe data, aerodynamic data and engine data, presumes various data of said data bases from the air velocity vector signal and airframe motion detection sensor signals and selects them by a table look-up and interpolation to store a control program for every flight configuration for generating a flight control law, thus facilitating air active control during every flight configuration of takeoff, cruising and landing.

Preferably, the air flight velocity vector signal is taken into a closed loop system in parallel with airframe motion detection sensor signals, a feedback control system and a feedforward control system are brought into engagement with each other, and a ratio between the control systems is varied according to the flight configuration so that control may be made. Further, preferably, the air flight velocity vector signal is taken into the closed loop system in parallel with airframe motion detection sensor signals, the air flight velocity vector signal and airframe motion detection sensor signals are brought into engagement with each other, and a ratio of engagement between the air flight velocity vector signal and airframe motion detection sensor signals is varied.

BRIEF DESCRIPTION OF THE DRAWINGS

FIG. 8 (a) is a schematic view of an air active control aircraft according to another embodiment of the present invention, and FIG. 8 (b) is an enlarged view of a nose portion thereof.

DESCRIPTION OF THE PREFERRED EMBODIMENTS

Figure 1:
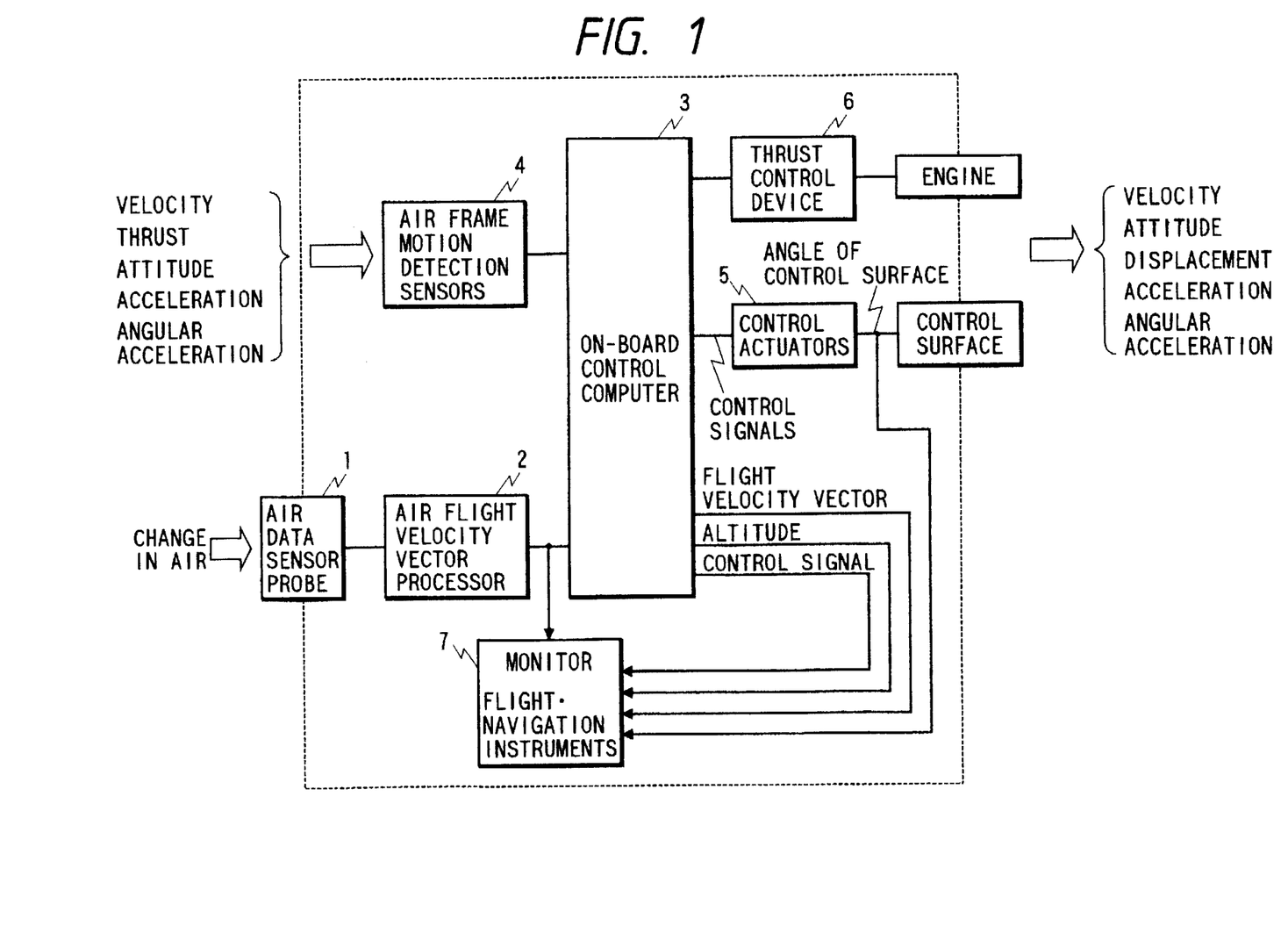
FIG. 1 is a schematic block diagram of an air active control aircraft according to a first embodiment of the present invention.
Figure 2:
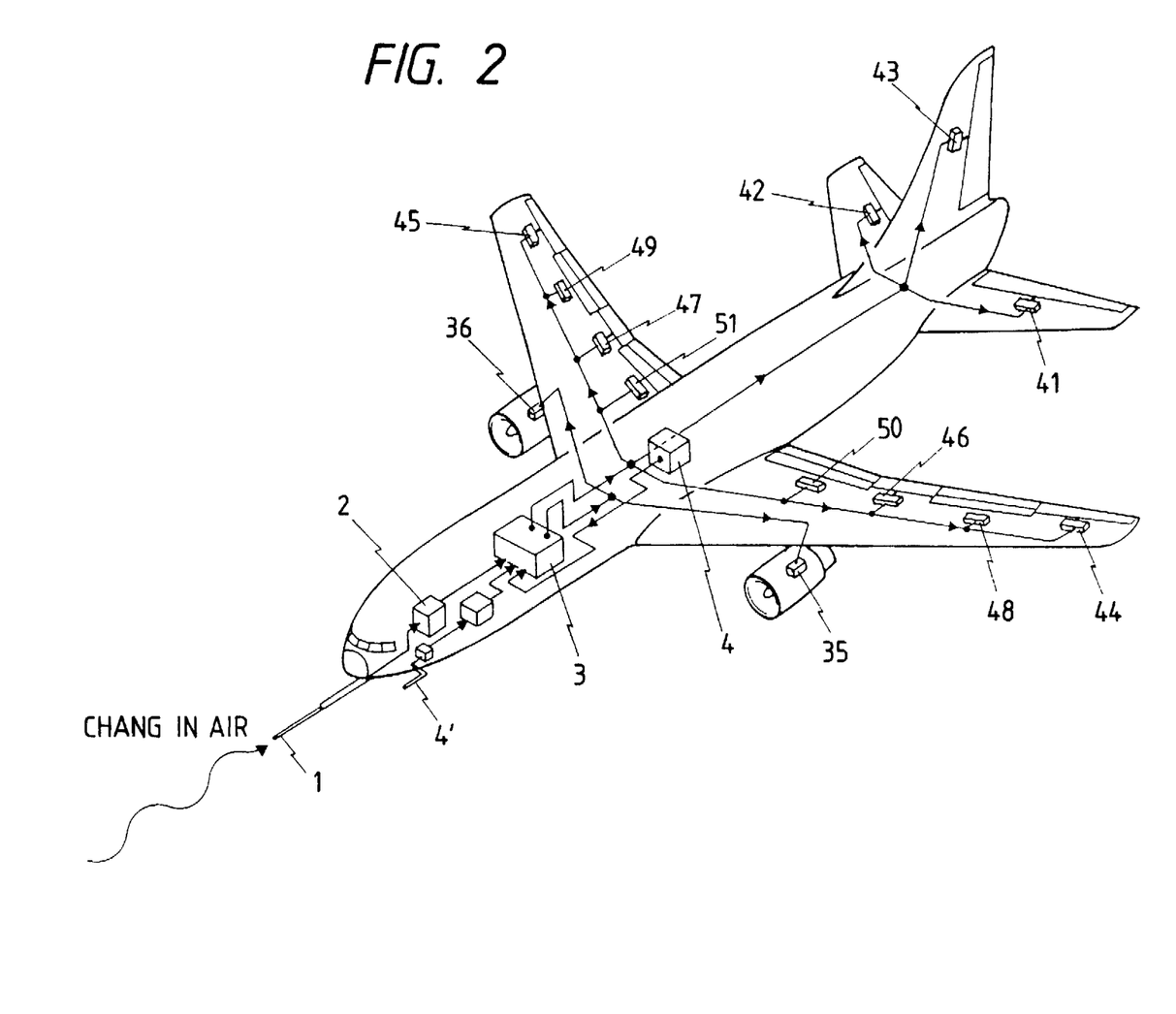
FIG. 2 is a schematic view of the air active control aircraft corresponding to one shown in FIG. 1.
Figure 3:
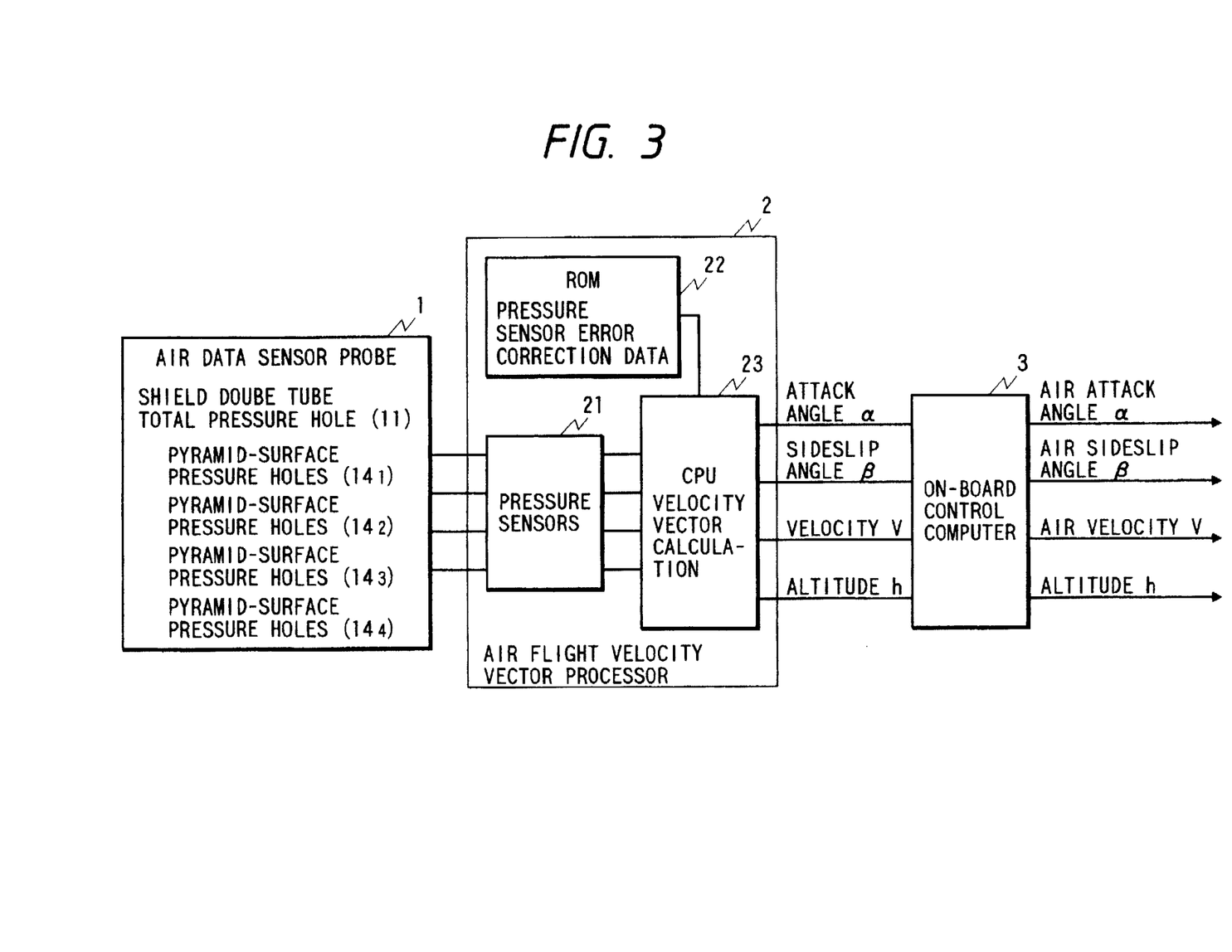
FIG. 3 is a schematic block diagram of a control signal generation system in FIG. 1.

FIG. 1 is a control block schematic view of an air active control aircraft in which a three-dimensional true airspeed detection system is mounted on a general air active control aircraft, and FIG. 2 is a schematic view of an air active control aircraft corresponding to one shown in FIG. 1.

An active control device of the air active control aircraft according to the present embodiment is mainly composed of a control signal generation system comprising an air data sensor probe 1, an air flight velocity vector processor 2, an on-board control computer 3, a group of conventional airframe motion detection sensors 4 and a conventional Pitot 4',  a group of various control surface actuators 5 for receiving a control signal from the control signal generation system to drive various control surfaces, and a thrust control device 6 for controlling engine output.

Figure 7:
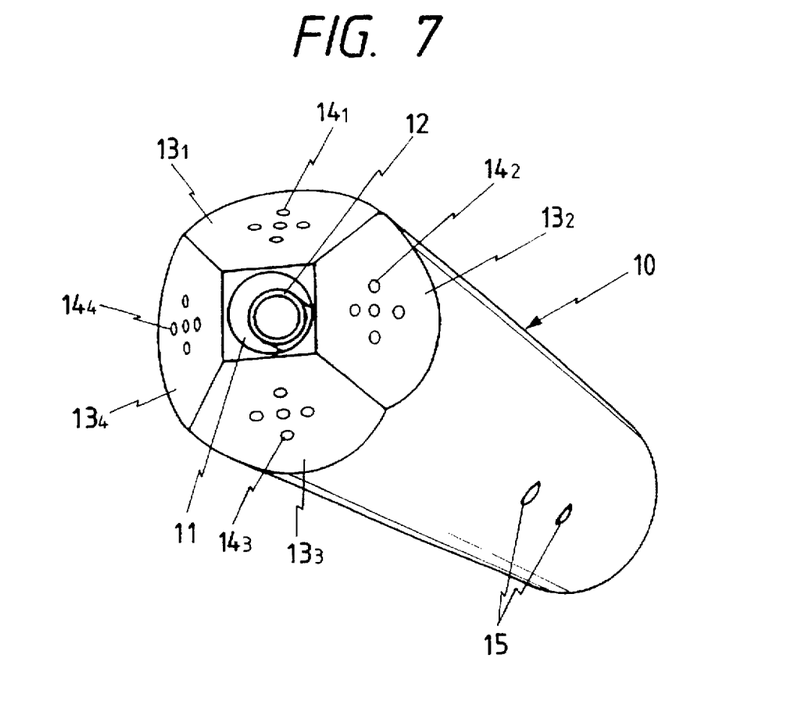
FIG. 7 is a perspective view of a truncated pyramid-shape Pitot probe.

The air data sensor probe 1 is comprised of a truncated pyramid-shape Pitot probe 10 shown in FIG. 7 and is provided to be projected from the extreme end of an aircraft, as shown in FIG. 2, in order to decrease an error in position and in order to quickly detect a change in air in the flight direction. While the probe 10 is preferably provided to be projected from the extreme end of the aircraft as described above, it is to be noted that the probe can be provided at a position less affected by the aircraft, for example, such as a top of a front body of the aircraft.

The truncated pyramid-shape Pitot probe 10 is configured similarly to that previously proposed by the present inventor, in which an extreme end thereof has a truncated pyramid-shape, on the top of which is provided a shield hole 11, a total pressure tube 12 having a diameter less than that of the shield hole is arranged and fixed at a position on the inner side by a predetermined length from the extreme end of the shield hole determined by a relation with the diameter of the shield hole, the shield hole 11 being provided with a branch hole 15 at the bottom end to allow some of the pressure within the shield hole to leak. Each of square pyramid surfaces $13_1$ to $13_4$ of the truncated pyramid-shape (square pyramid-shape) is formed with a plurality of groups of pressure holes $14_1$ to $14_4$. The truncated pyramid-shape Pitot probe 10 is positioned in a three-dimensional flow whereby a total pressure H of the total pressure tube 12 and pressures $P_1$ to $P_4$ of the groups of pressure holes $14_1$ to $14_4$ on the square pyramid surfaces can be measured.

The air flight velocity vector processor 2 is provided to operation-process the velocity vector from pressure information from the truncated pyramid-shape Pitot probe 10. The aforementioned processor has a pressure sensor 21 for converting the pressure into an electric signal and a ROM 22 which stores therein a pressure coefficient for correcting pressure information of the probe 10 obtained by experiments of the wind tunnel in advance, and is composed of a CPU 23 for operation-processing the velocity vector from the pressure information on the basis of the velocity vector analyzing software.

According to the air flight velocity vector processor of the present embodiment, the total pressure H and differentials (H-$P_1$), (H-$P_2$), (H-$P_3$), and (H-$P_4$) can be obtained from the total pressure H measured by the truncated pyramid-shape Pitot probe 10 and the pressures $P_1$ to $P_4$ on the square truncated pyramid-surface. The operation can be executed on the basis of the velocity vector analyzing software from the pressure informations and the air temperature sensors to obtain the flight velocity vectors of the true air velocity, the attack angle and the angle of sideslip. That is, it is possible to grasp the direction of wind or the like in the flight condition in real time. Further, the altitude h is obtained from static pressure to thereby obtain the rate of climb, and Mach number is obtained from dynamic pressure and static pressure.

The on-board control computer 3 stores therein airframe and aerodynamic force data bases obtained by the wind tunnel test or the like and engine data bases obtained by the engine performance test in a ROM, and receives therein programs for predicting the flight conditions induced with respect to the change in air on the basis of the control rule and the flight rule from the aforementioned informations to create a flight control law for the air flight stabilization control. The flight control law varies with the kind of airframes and varies with the interference and operation procedures. Basically, however, the air flight velocity vector signals (such as the attack angle α, angle of sideslip β, altitude h signals) and airframe motion detection sensor signals are input in parallel into a control surface control closed loop system and an engine control closed loop system, and the air flight velocity vector signal induced by the change in air is received to predict the flight motion so as to perform the feedback control or feedforward control of the engine thrust and various control surfaces.

While in the above-described flight stabilization control law, the feedback control system and the feedforward control system are brought into engagement with each other, it is to be noted that a ratio of engagement between the control systems may always be made constant or may be varied according to the flight configuration or the like. For example, at the time of takeoff, climbing, descent/approach and landing particularly likely affected by a gust of wind, cross-wind or wind shear, the feedforward control takes precedence over the other, whereas at the time of cruising, only the feedforward control system may be employed. Likewise, the ratio of engagement between the signal of change in air and the airframe motion signal may be changed according to the flight configuration to generate the control law.

Figure 4:
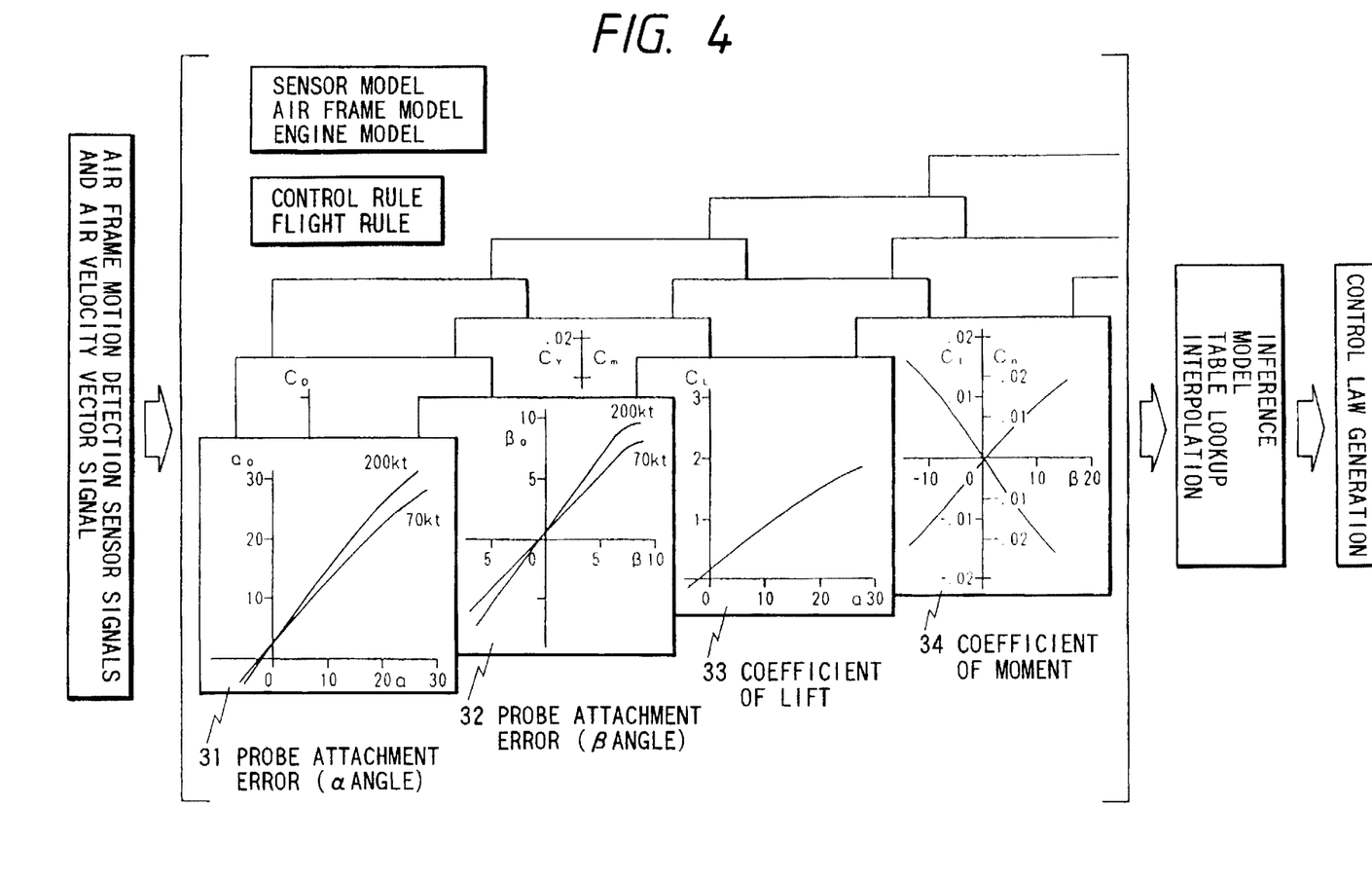
FIG. 4 is a schematic view of generation of a control law by an on-board control computer.

FIG. 4 shows one example of a procedure for generating a control law. As airframe and aerodynamic data base, necessary data, for example, such as probe position error tables 31, 32 for every attack angle (α angle) and angle of sideslip (β angle), a lift coefficient table 33 due to the change in α angle, and a moment coefficient table 34 due to the change in β angle are ROMed and stored in the on-board control computer. These data are selected by inference, table look-up and interpolation to create the flight control law for every flight configuration of takeoff, cruising and landing.

Thereby, for example, in the aircraft shown in FIG. 2, from the on-board control computer 3, an engine thrust control command is given to engine thrust control devices 35 and 36, and a control-surface control command is given to control actuators 41 to 51 of main control blade surfaces such as an elevator, a rudder and an aileron and secondary control surfaces such as a spoiler and a flap to control the engine and the control surfaces in order to obtain the speed, attitude, altitude, heading orientation and rate of climb (descent) necessary for the stabilized flight of the aircraft with respect to the change in air. At the same time, an output from the on-board control computer is displayed on a monitor 7 in a cockpit. If necessary, it is possible to separate the air flight velocity vector signal from the air active control system to perform the manual control on the basis of the monitor information.

Figure 5:
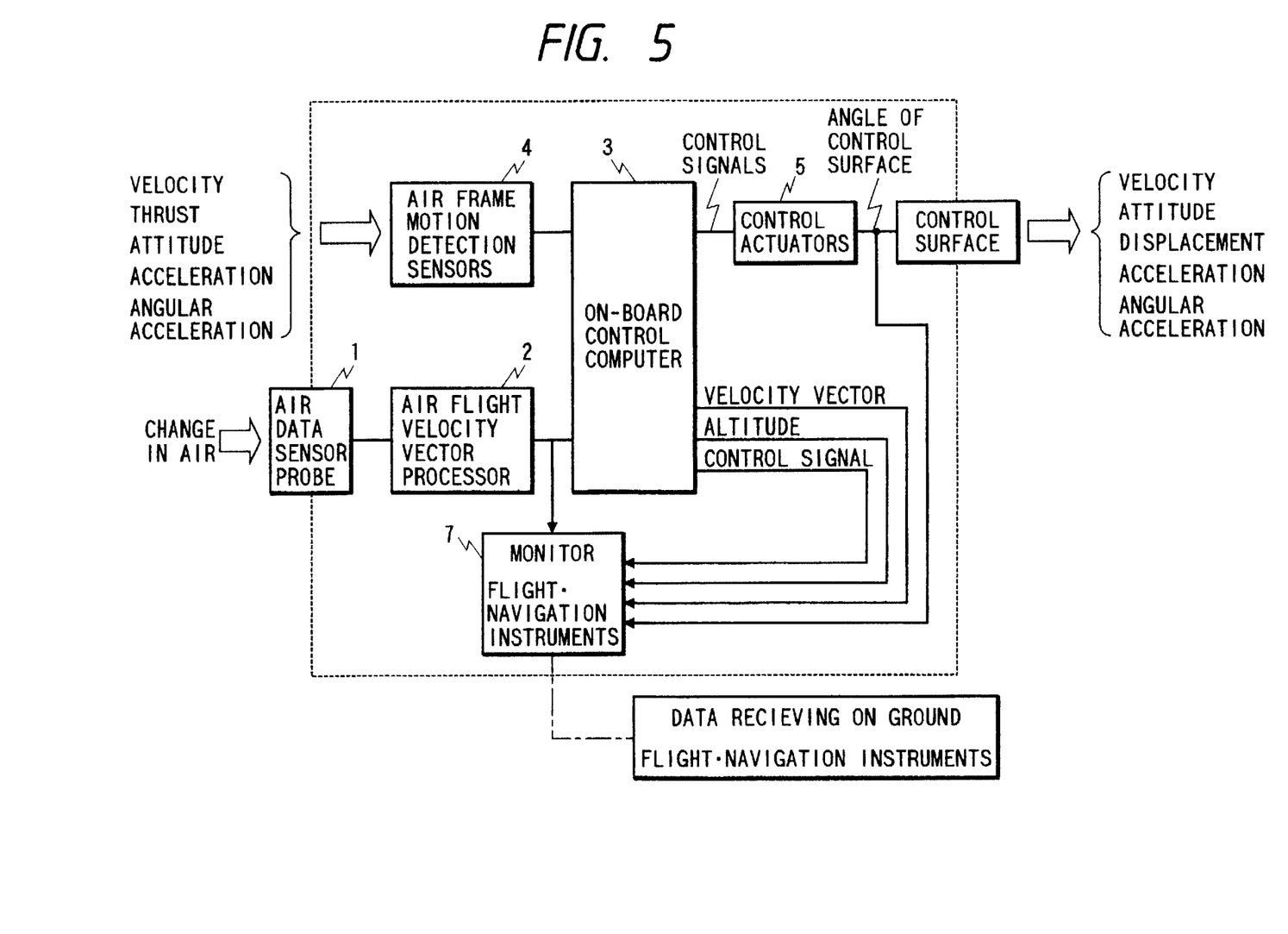
FIG. 5 is a schematic block diagram of an air active control aircraft according to an embodiment of the present invention.
Figure 6:
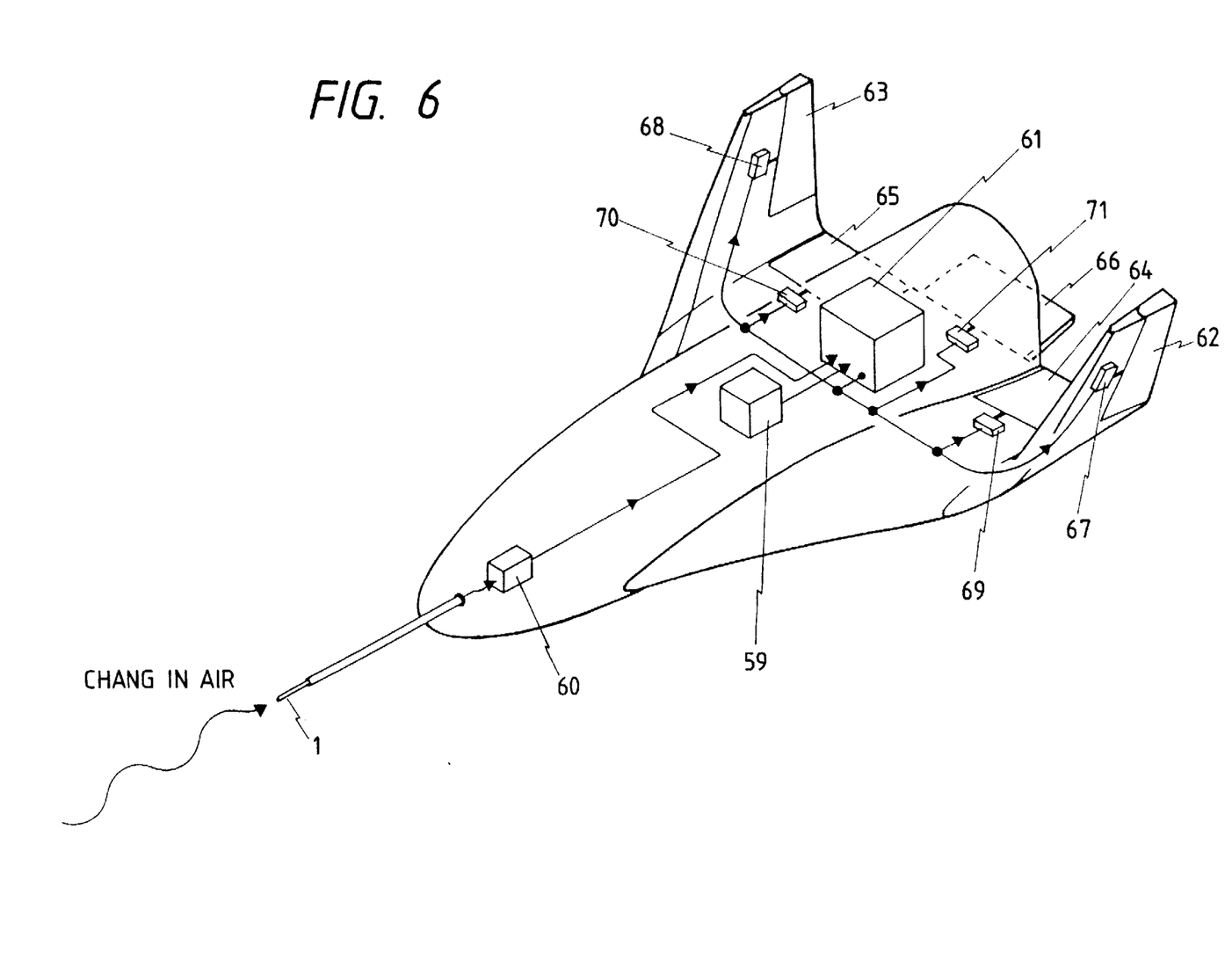
FIG. 6 is a schematic view of the air active control aircraft corresponding to one shown in FIG. 5.

In the foregoing, the embodiment in case of the manned airframe has been described. However, the present invention can also be applied to an unmanned airframe, for example, such as an unmanned spacecraft without an engine now under development now. FIG. 5 is a control block schematic view of an air active control aircraft which is combined with a global positioning system (GPS) to enable unmanned remote control. FIG. 6 is a conceptual schematic view of the air active control aircraft corresponding to one shown in FIG. 5.

The present embodiment is substantially similar to the previously mentioned embodiment except that the engine control closed loop is not provided, and that various flight and navigation data of the output of the on-board control computer are transmitted to the control room on the ground by a data transmitter. Accordingly, in the figure, parts having the same concept in FIG. 5 as those of FIG. 1 are indicated by the same reference numerals as those of the previous embodiment, detailed description of which is omitted.

In the present embodiment, when the airframe runs into aerosphere close to the ground, the air data sensor probe 1 is projected forward of the heading to detect the change in air data. In FIG. 6, reference numeral 59 designates airframe motion detection sensors such as a three-axis gyro, 60 an operation processor of the three-dimensional true airspeed detection system, 61 an on-board control computer, and 59 airframe motion detection sensors such as a three-axis gyro, which constitute a control signal generation system similar to the previously described embodiment. In the present embodiment, a control-surface control command is given to control surface actuators 67 to 71 for driving rudders 62, 63, elevons 64, 65 and a body flap 66 by an output signal from the on-board control computer, and the control surfaces are controlled to obtained the attitude, heading orientation and rate of descent so that the flight motion induced by the change in air is predicted to enable the stable descent/approach and landing.

Figures 8A, 8B:
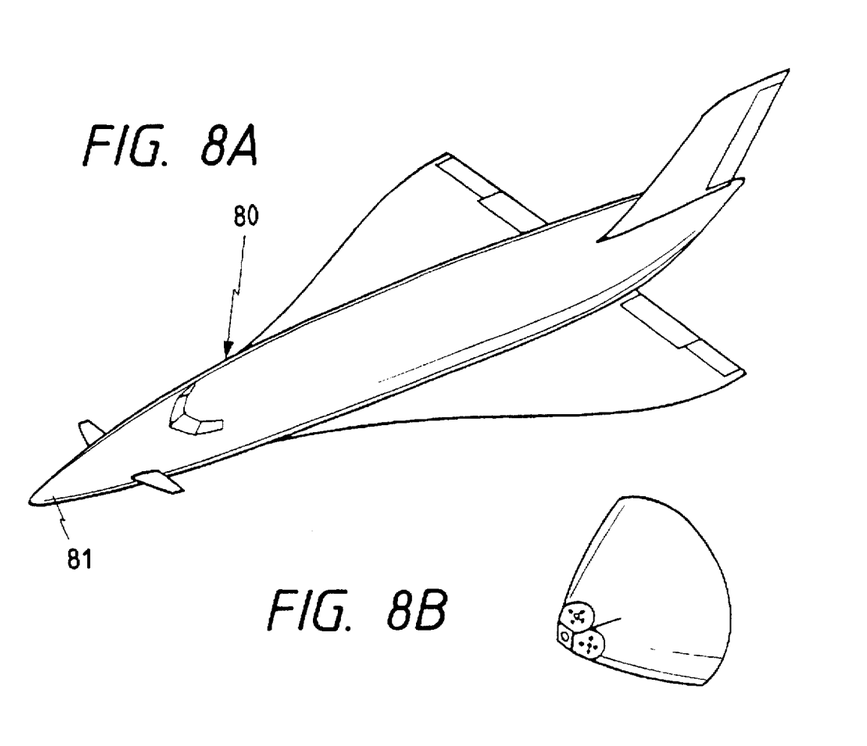

FIGS. 8(a) and (b) show another embodiment of the air active control aircraft. In this embodiment, a nose portion 81 of a supersonic airframe 80 is formed as a truncated pyramid-shape Pitot probe 82 as shown in an enlarged scale in FIG. 8 (b). The construction of the probe 82 is similar in basic construction to that of the probe of the previously described embodiment.

What is claimed is:

1. An air active control aircraft comprising:

a three-dimensional true airspeed detection system including an air data sensor probe consisting of a truncated pyramid-shape Pitot probe and an air flight velocity operation processor for generating an air flight velocity vector signal from air pressure information detected in the three dimensions by said air data sensor probe;

airframe motion detection sensors for detecting motion of an airframe; and an on-board control computer for generating a flight control logic, wherein said on-board control computer inputs said air flight velocity vector signal generated from said air flight velocity operation processor into a control-surface control system along with parallel inputs of airframe motion detection sensor signals generated from said airframe motion detection sensors to generate said flight control logic for carrying out the three-dimensional air flight stability control, wherein said on-board control computer stores airframe data obtained by a wind tunnel test, aerodynamic data and engine data to form a data base, selects data of said data base by inference, table look-up and interpolation for every flight configuration of takeoff, cruising and landing based on said air flight velocity vector signal and said airframe motion detection sensor signals, and generates said flight control logic.

2. The air active control aircraft according to claim 1, wherein said air active control aircraft is an active control aircraft with an engine, in which said air flight velocity vector signal is taken into an engine control system for making an engine thrust adjustment in parallel with said airframe motion detection sensor signals.

3. The air active control aircraft according to claim 1, wherein said air active control aircraft is an active control aircraft without an engine, in which the air flight stabilization control is carried out only by control-surface control.

4. The air active control aircraft according to claim 1, 2 or 3, wherein said truncated pyramid-shape Pitot probe projects from the extreme end of the airframe.

5. The air active control aircraft according to claim 1, 2 or 3, wherein said truncated pyramid-shape Pitot probe forms a nose portion of a supersonic airframe.

6. An air control aircraft comprising:

a three-dimensional true airspeed detection system including an air data sensor probe consisting of a truncated pyramid-shape Pitot probe and an air flight velocity operation processor for generating an air flight velocity vector signal from air pressure information detected in the three dimensions by said air data sensor probe;

airframe motion detection sensors for detecting motion of an airframe; and an on-board control computer for generating a flight control logic, wherein said on-board control computer inputs said air flight velocity vector signal generated from said air flight velocity operation processor into a control-surface control system along with parallel inputs of airframe motion detection sensor signals generated from said airframe motion detection sensors to generate said flight control logic for carrying out the three-dimensional air flight stability control, wherein said air flight velocity vector signal and said airframe motion detection sensor signals are input in parallel into a control surface control closed loop system and an engine control closed loop system, and wherein feedback control and feedforward control are used together in both said closed loop systems, and a ratio of utilization between said feedback control and said feed forward control is varied according to the circumstances of flight.

7. An air active control aircraft comprising, a three-dimensional true airspeed detection system including an air data sensor probe consisting of a truncated pyramid-shape Pitot probe and an air flight velocity operation processor for generating an air flight velocity vector signal from air pressure information detected in the three dimensions by said air data sensor probe;

airframe motion detection sensors for detecting motion of an airframe; and an on-board control computer for generating a flight control logic, wherein said on-board control computer inputs said air flight velocity vector signal generated from said air flight velocity operation processor into a control-surface control system along with parallel inputs of airframe motion detection sensor signals generated from said airframe motion detection sensors to generate said flight control logic for carrying out the three-dimensional air flight stability control, wherein said air flight velocity vector signal and said airframe motion detection sensor signals are input in parallel into a control surface control closed loop system and an engine control closed loop system, said air flight velocity vector signal and said airframe motion detection sensor signals are brought into engagement with each other, and an engaging ratio between said air flight velocity vector signal and said airframe motion detection sensor signals is varied to generate a control law.

* * * * *

UNITED STATES PATENT AND TRADEMARK OFFICE
CERTIFICATE OF CORRECTION

PATENT NO.    : 5,797,105
DATED         : August 18, 1998
INVENTOR(S)   : Teruomi Nakaya et al.

It is certified that error appears in the above-identified patent and that said Letters Patent is hereby corrected as shown below:

Title page,
Amend Item [73] as follows:

Change "National Aerospace Laboratory of Science & Technology, Tokyo, Japan" to -- National Aerospace Laboratory of Science & Technology Agency, Chofushi, Japan; and National Space Development Agency of Japan (NASAD), Tokyo, Japan --.

Signed and Sealed this

Twenty-fifth Day of December, 2001

Attest:

JAMES E. ROGAN
*Attesting Officer*     *Director of the United States Patent and Trademark Office*